Figure 2:
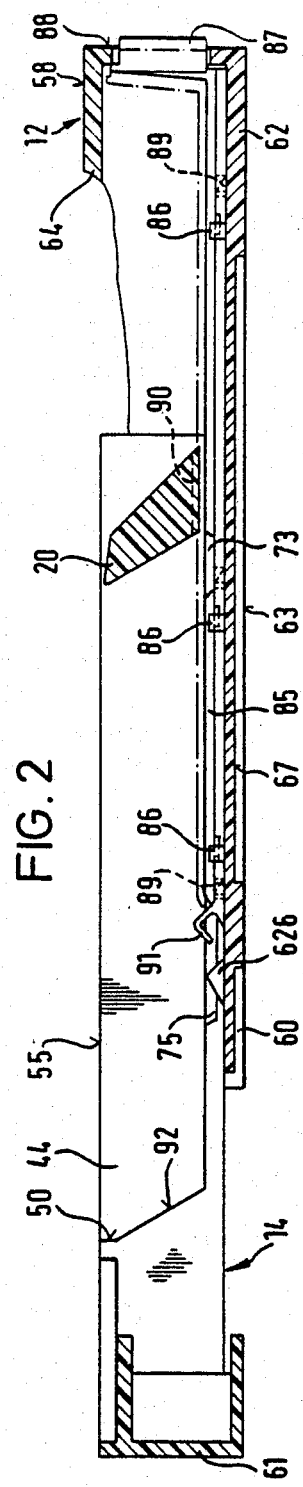

United States Patent [19]

Ackeret

[11] Patent Number: 4,783,919
[45] Date of Patent: Nov. 15, 1988

[54] DEVICE FOR THE CYCLIC REARRANGEMENT OF A PILE OF SHEETS

[75] Inventor: Peter Ackeret, Kusnacht, Switzerland

[73] Assignee: Licinvest AG, Chur, Switzerland

[21] Appl. No.: 885,565

[22] PCT Filed: Nov. 12, 1985

[86] PCT No.: PCT/EP85/00612

§ 371 Date: Jul. 11, 1986

§ 102(e) Date: Jul. 11, 1986

[87] PCT Pub. No.: WO86/03026

PCT Pub. Date: May 22, 1986

[30] Foreign Application Priority Data

Nov. 13, 1984 [DE] Fed. Rep. of Germany ....... 3441449

[51] Int. Cl.$^4$ .............................................. G09F 11/30
[52] U.S. Cl. ........................................ 40/511; 40/490; 40/513
[58] Field of Search ................. 40/511, 513, 489, 490, 40/488

[56] References Cited

U.S. PATENT DOCUMENTS

| | | | |
|---|---|---|---|
| 2,823,829 | 2/1958 | Frater | 206/519 |
| 3,377,727 | 4/1968 | Weggeland | 40/511 |
| 3,425,147 | 2/1969 | Marx | 40/155 |
| 3,495,345 | 2/1970 | Weggeland | 40/490 |
| 4,238,898 | 12/1980 | Ackeret | 40/511 |
| 4,238,899 | 12/1980 | Ackeret | 40/511 |
| 4,241,528 | 12/1980 | Ackeret | 40/511 |
| 4,241,529 | 12/1980 | Baur | 40/490 |
| 4,242,820 | 1/1981 | Ackeret | 40/513 |
| 4,245,417 | 1/1981 | Ackeret | 40/513 |
| 4,259,802 | 1/1981 | Ackeret | 40/513 |

FOREIGN PATENT DOCUMENTS

| | | |
|---|---|---|
| 2912642 | 3/1980 | Fed. Rep. of Germany . |
| 3342238 | 6/1984 | Fed. Rep. of Germany . |
| 2403574 | 4/1979 | France . |
| 2440902 | 6/1980 | France . |

Primary Examiner—Gene Mancene
Assistant Examiner—J. Hakomaki
Attorney, Agent, or Firm—Robert R. Jackson

[57] ABSTRACT

A device for the cyclic rearrangement of a pile of rectangular sheets, especially photographic prints. The device includes first and second frame parts (12, 14), of which one has a viewing window (35) in front of a principal face of the pile. The frame parts can be pulled away from each other and pushed back together again parallel to the plane of this face. A single sheet is removed from one end of the pile when the frame parts are pulled away from each other and returned to the other end of the pile when the frame parts are pushed together. During its movement relative to the window, the sheet facing the window is held spaced from the window by elements on the frame parts which are arranged and designed so that they overlap all edges of the picture but nevertheless render possible the passage of the picture through the gap defined by those elements.

58 Claims, 15 Drawing Sheets

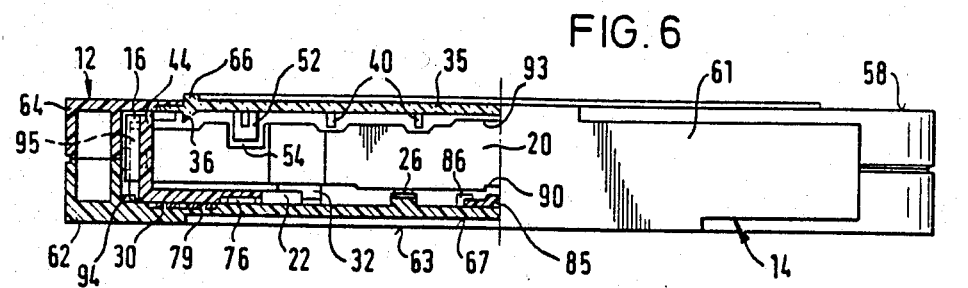
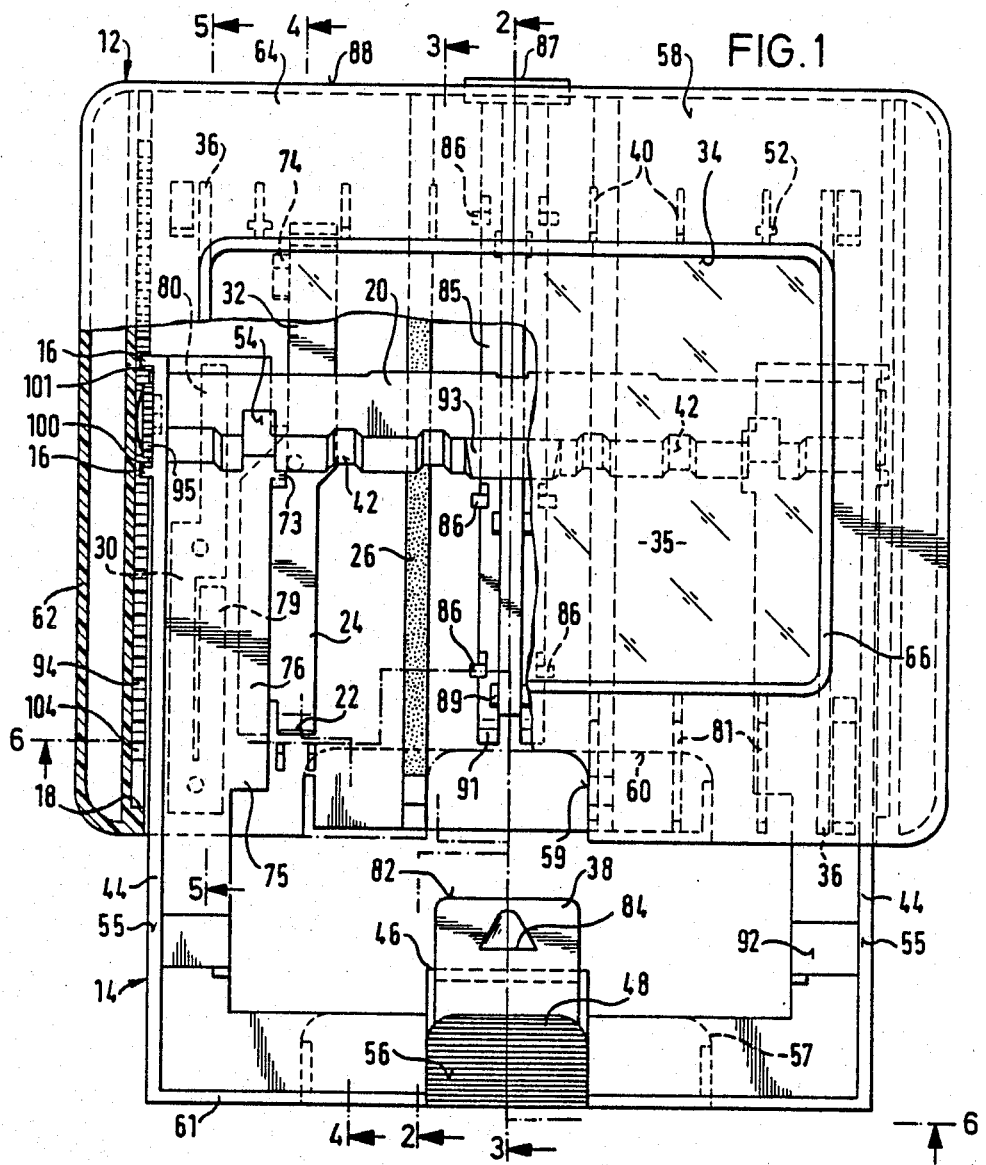

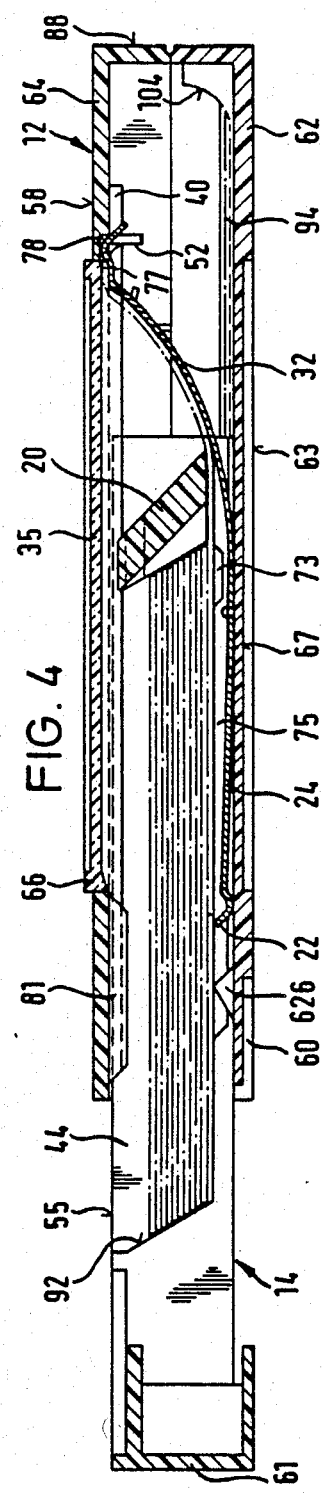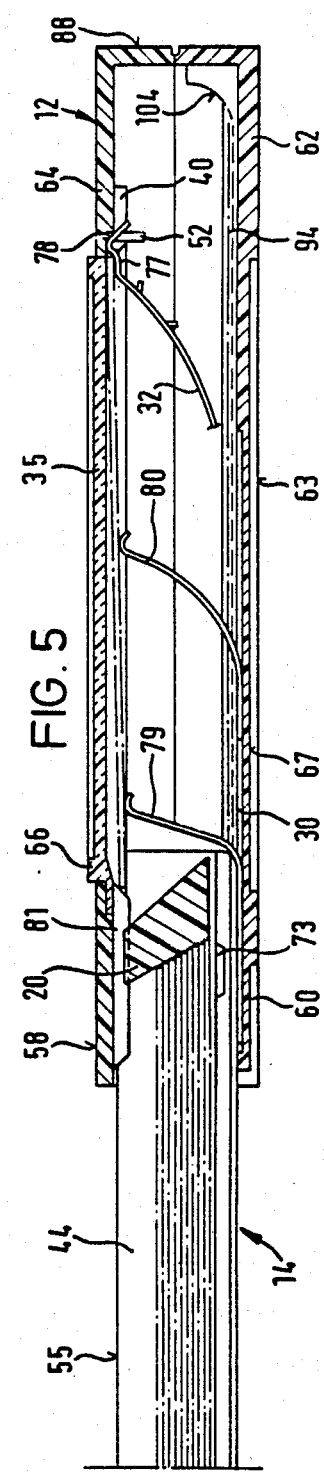

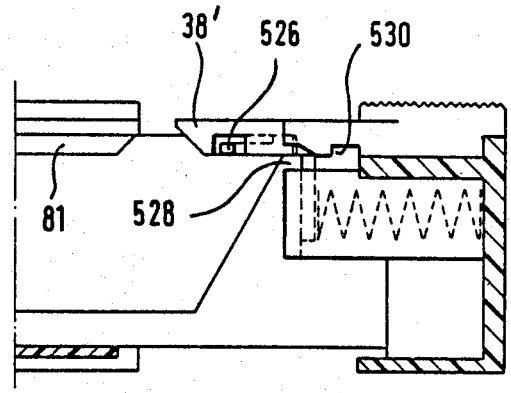
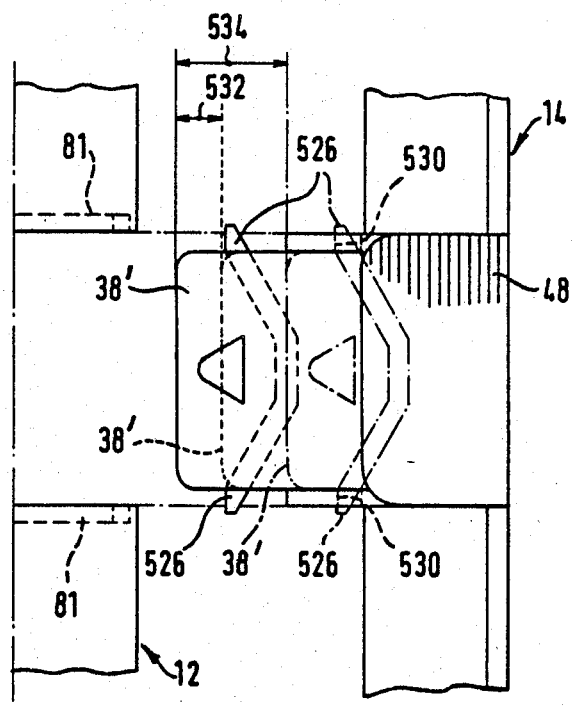

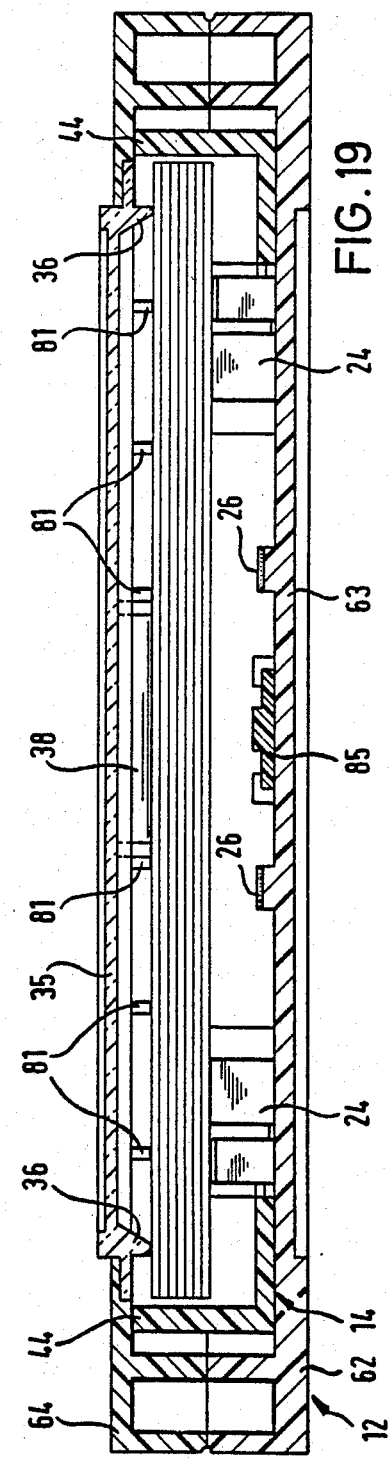
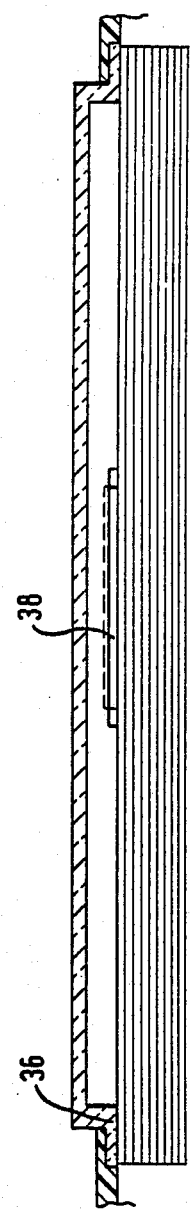

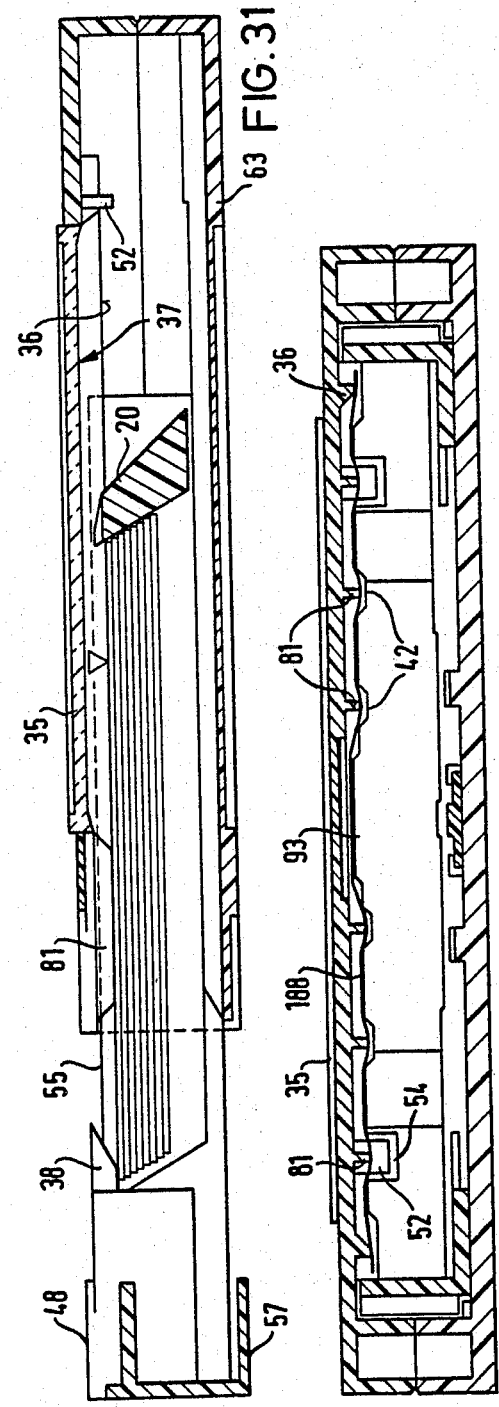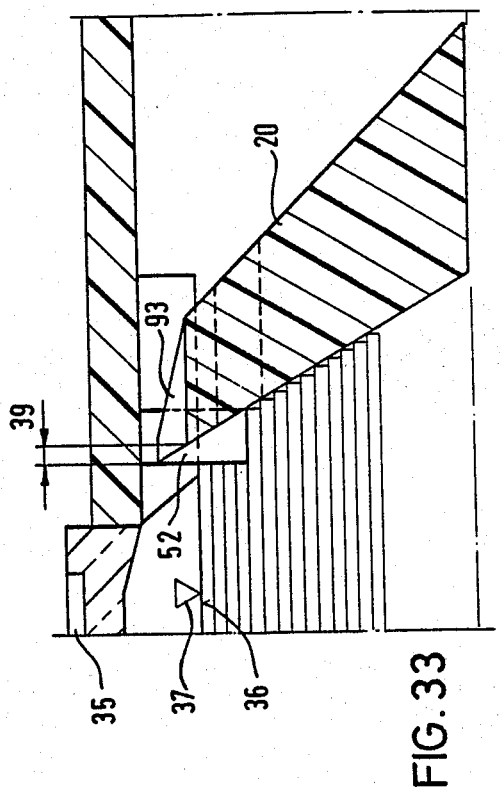

DEVICE FOR THE CYCLIC REARRANGEMENT OF A PILE OF SHEETS

The invention relates to a device for the cyclic rearrangement of a pile of sheets. Devices of this type are known from the following U.S. Pat. Nos. 4,238,898, 4,238,899, 4,241,528, 4,245,417, 5,259,802 and 4,376,348.

The known devices, here and in the following usually referred to as "sheet changers" or "picture changers", comprise a first frame part, for example a housing provided with a viewing window, and a second frame part, for example a slider member that can be pulled out of and pushed back into the housing parallel to the plane of the viewing window. The frame parts contain a changeover mechanism which may be one of a wide variety of constructions; the effect of the changeover mechanism is to remove a sheet from one end of a pile, for example that end remote from the window pane, when the frame parts are pulled away from each other, and return it to the other end of the pile when the frame parts are pushed together, that is, in the case given by way of example, to that end of the pile facing the viewing window. During this operation, either when the frame parts are pulled away from each other or when they are pushed together, the uppermost sheet of the pile in the case concerned executes a movement relative to the window.

If the sheets are photographic prints, their surface is relatively rough; in addition, dust may also be deposited on them. As long as a viewing window made of mineral glass is used this does not present any problems; since, however, picture changers of this type are intended for mass production and are to be manufactured at a favourable price from injection-moulded plastics components, a plastics material, for example acrylic resin, is also preferred for the window. In this case, without additional measures the inner side of the window, even after a relatively small number of picture-change operations, becomes so very scratched that it is practically impossible to see through.

In the above-mentioned U.S. Pat. No. 4,376,348, therefore, means are disclosed which are intended to ensure that, at least during the relative movement between the uppermost sheet in the pile and the viewing window, a safety spacing is maintained between the two. These means comprise holding-down members which overlap the edges of the pile that extend parallel to the direction of withdrawal of the slider member.

Photographic prints are not only rough but also, owing to their physico-chemical properties, almost never flat but generally bowed or warped. There is consequently a risk that, in spite of the mentioned holding-down members, contact may still occur in some areas between the picture and the window, for instance in the central plane of symmetry of the window, so that a mat channel forms there.

The problem of the invention is to provide a device of the type mentioned at the beginning in which this risk is eliminated without the spacing between the picture and the window being enlarged to a very great extent, because this would be both uneconomic and less aesthetic.

This problem is solved in accordance with the invention by a device for the cyclic rearrangement of a pile of rectangular sheets, especially photographic prints, with a first and a second frame part, of which one has a viewing window in front of a principal face of the pile, which frame parts can be pulled away from each other and pushed back together again parallel to this plane, and with means for removing a sheet from one end of the pile when the frame parts are pulled away from each other and for adding this sheet to the other end of the pile when the frame parts are pushed together, and with means which are provided on the frame part movable relative to the window and which hold the sheet that faces the window, at least during its movement relative to the window, spaced from the window, by overlapping the sheet edges that extend transversely to the direction of movement.

As described in the following explanation of examples of execution, the design of the means is such that the actual sheet changeover operation is not interfered with, that is to say the separated sheet can be conveyed under the spacing means. This is made possible in various ways:

The means, which owing to their spacing function are referred to hereinafter as "holding-down members", may be stationary or movable.

A type of "non-return valve" may be provided, which allows the picture to pass through in the desired direction but then returns to the holding-down position.

Rendering the holding-down member operative can be controlled by the frame part movement.

Further possibilities are disclosed to the person skilled in the art in the following description of examples of execution. It should be pointed out, here, that as regards the "non-critical" holding-down members reference may be made also to embodiments that have been disclosed in the above-mentioned patent specification.

Examples of execution of the subject of the invention are illustrated in the accompanying drawings and are explained in detail hereinafter.

Figure 7:
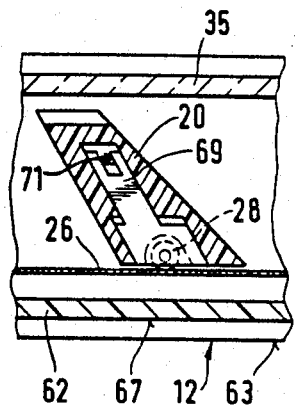
Figure 8:
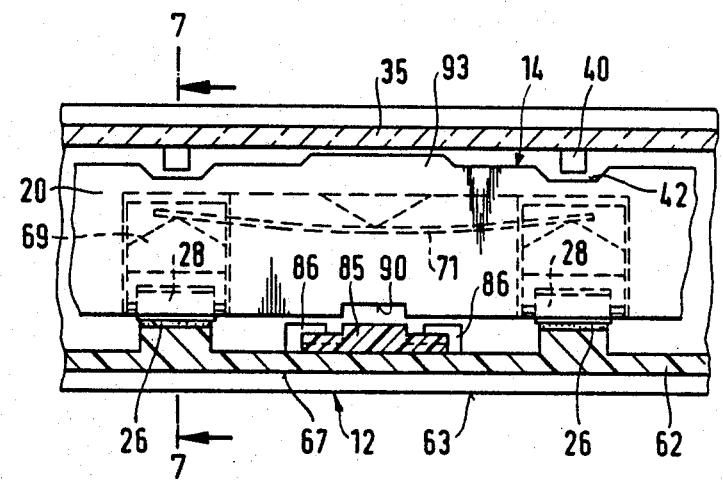
Figure 9:
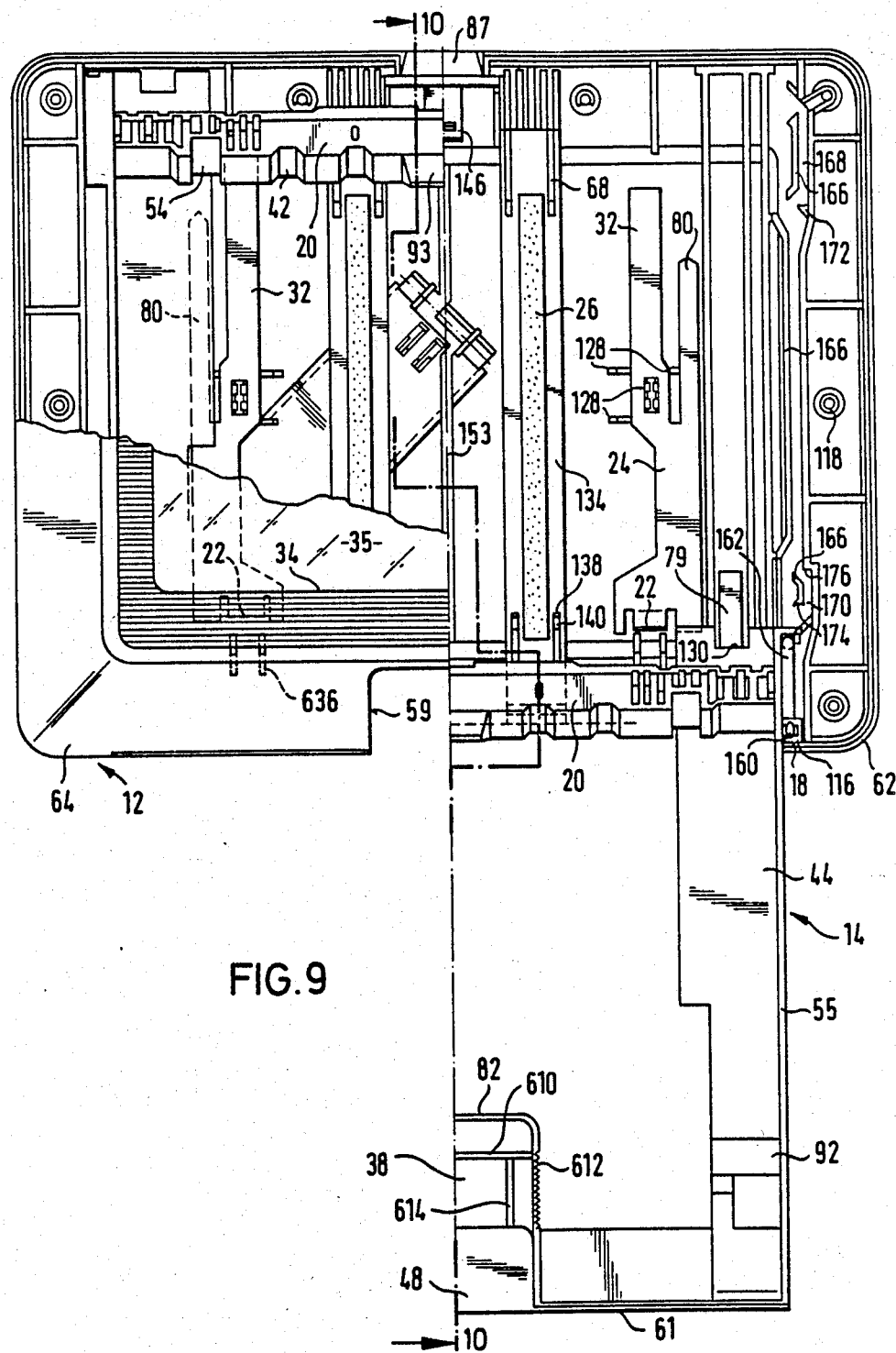
Figure 10:
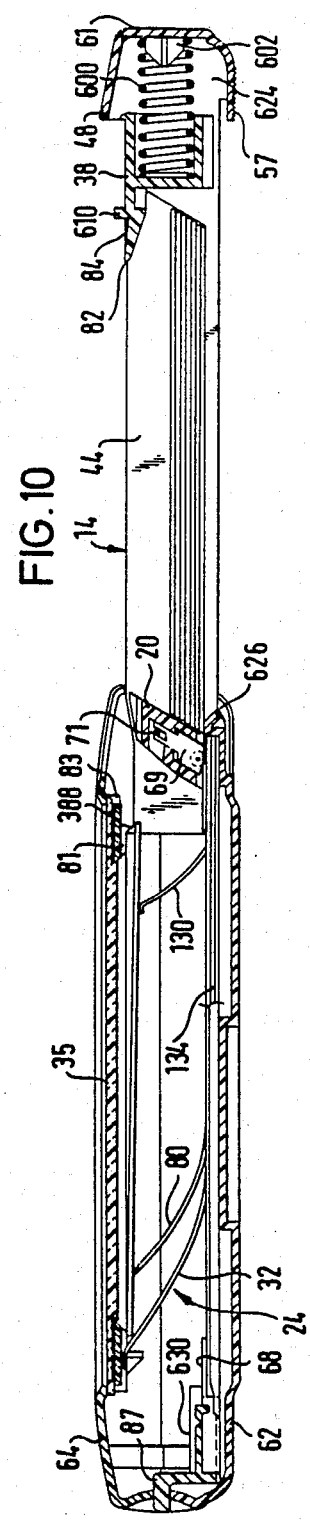
Figure 11:
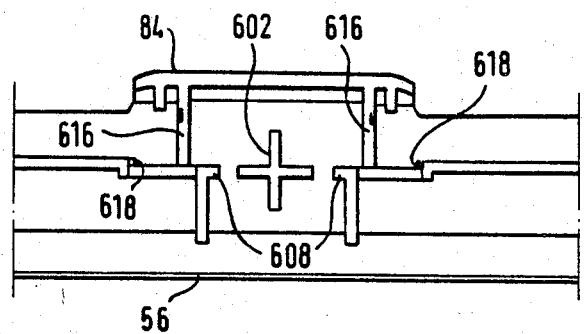
Figure 12:
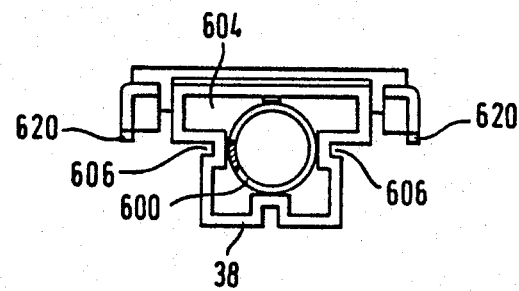
Figure 13:
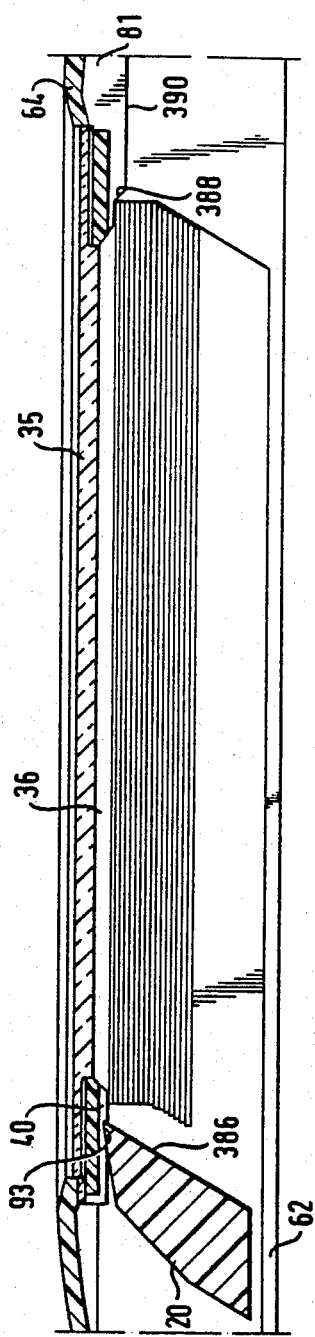

FIG. 1 shows in plan view and partial section a first example of execution, with the frame parts pulled approximately half way apart, FIGS. 2 to 5 are longitudinal sections corresponding to the identically numbered section lines in FIG. 1, FIG. 6 is a partial transverse section along the line 6—6 of FIG. 1, FIG. 7 is a partial longitudinal section through an element of a separating means in FIG. 1, FIG. 8 is a partial transverse section through the same element, FIG. 9 shows a second example of execution in plan view, partially cut away, and in one half of the diagram with the frame parts partially drawn apart, FIG. 10 is an associated longitudinal section, FIGS. 11 and 12 are transverse sections for illustrating one of the holding-down members, FIG. 13 is a schematic longitudinal section and shows the starting position of the frame parts, FIGS. 14 to 18 illustrate an alternative form of this holding-down member, FIGS. 20 to 33 are schematic representations of alternative designs and details of movable or fixed holding-down members.

If the nature of the representation (section, view etc.) is not obvious to the person skilled in the art from the Figures, attention is drawn to the descriptions of the Figures concerned. The person skilled in the art can then complete these representations appropriately by appropriate transfer of the remaining details from FIGS. 1 to 13, or alternatively can refer back to constructions described in the patent specifications mentioned at the beginning.

The picture changer shown in FIGS. 1 to 8 comprises as first frame member a housing 12 and as second frame member a slider member 14 for accommodating a pile of pictures, wherein the slider member 14 can be pulled out of the housing for a distance limited by stop members 16 on the slider member and complementary stop members 18 on the housing 12 and pushed back in again. The separating means is formed by a separator bar 20. The feeding means is embodied by hook-like members 22 which are located on leaf-spring type spring arms 24. The retaining means for holding the remainder of the pile in the slider member is likewise formed by the separator bar, whilst the separated individual picture is held in the housing by the co-operation of rails, arranged fixedly in the housing and provided with a retentive coating 26, with rollers 28 that hold the individual picture firmly against the rails and are caused to rotate as a result of contact with the rails. Finally, the guide means is embodied by pairs of leaf springs 30 and spring arms 32, the spring arms 32 being formed integrally with the spring arms 24.

In the inserted state of the slider member 14, the spring arms 24 and 32 press the pile of sheets (not shown in FIG. 1) against a viewing window, the inner border of which is denoted by 34. The sheet which is then uppermost in the pile, a photographic print, is intended to lie as flat as possible; to that end, at its periphery it is supported in a plane that is defined by lateral ribs 36, by the underside of a slidable catch 38 and, at the opposite end, by ribs 40 moulded on the housing.

FIG. 1 shows the partially withdrawn position of the slider member 14. In the inserted state, the separator bar lies on the other side of these ribs 40; however, because it projects further towards the window 35 which corresponds to the height of these ribs, it has recesses 42 so that the ribs are able to pass through.

The edges of the pile are supported laterally, (that is, parallel to the withdrawal direction) by side pieces 44 of the slider member. At the front, that is, on the side of the slider member that is furthest away from the housing when the slider member is withdrawn, the edges are supported by the stop face 46 of a centrally arranged grip part 48 that the user may grip and by lateral stop faces 50 on the slider member. At the opposite end, the edges of the photographs are supported against stop members 52 moulded on the housing, for the passage of which the separator bar likewise has recesses 54 that are substantially deeper than those for the ribs 40.

The rib 36 extends further into the interior of the slider member than the height that is defined by the top edge 55 of the side pieces of the slider member so that the photographs are unable to slide out laterally over the side pieces of the slider member. An analogous action occurs between the separator bar on the one hand, the ribs 40 on the other.

The grip part 48 has a top part 56, arranged on the window side of the housing, and a bottom part 57 which is wider than the top part; the top wall 58 of the housing surrounding the window in the manner of a frame has a cut-out 59 in the region of the top part whilst the opposing housing wall is recessed at 60 in a complementary manner for the bottom part 57. Accordingly, in its closed state the device has a closed, substantially rectangular outline without any protruding parts.

The housing and the slider member are injection-moulded plastics parts. The slider member is a one-piece element, comprising side-pieces, separator bar, grip part and a front wall 61 joining the grip part to the side pieces, which are of L-shaped cross-section.

The housing is composed of three parts: the bottom shell 62 providing the base 63, the frame-like upper shell 64 with the window aperture, and the window 35 set into this. The housing is reinforced in the direction of the slider member movement in that the struts between the top and bottom wall are constructed as double supports, as shown in FIG. 6. The housing parts can be welded together, or a snap-fit connection may be provided.

Around its main surface the window has a narrow border 66 that protrudes slightly outwards, so that it is somewhat proud in respect of the frame surrounding it. A recess that is complementary with the outline of this border on the outside of the opposite bottom wall is denoted by the numeral 67 and permits several housings to be stacked one on top of the other.

When the slider member is withdrawn from the housing, it is gripped using one hand at the top and bottom parts of the grip part, whilst the other hand holds the housing. The hook-like members 22 engage the front edges of the photographs lying on the spring arm ends, that is the edges furthest away from the separator bar, as a result of which a certain number of photographs, depending on the height of the hook-like members, is fed to the separating means. This is basically formed as a through-gap which is defined, firstly by (in the example of execution) two lands 68 moulded on the base of the housing on the inside and, secondly, by the underside of shoes 69 that oppose the lands, the shoes being inserted into the separator bar and shown in FIG. 7 in section and in FIG. 8 in front view.

Each land 68 is associated with a respective shoe 69 and the land/shoe arrangements are located on both sides of the plane of symmetry 70 of the device. The shoes are guided longitudinally in the separator bar, are supported on a knife-edge-like bearing and biassed by an inserted wire spring 71. Each shoe additionally accommodates a small roller that is rotatable about an axis at right angles to the withdrawal direction and the small roller 28 projects slightly from the shoe.

Figure 3:
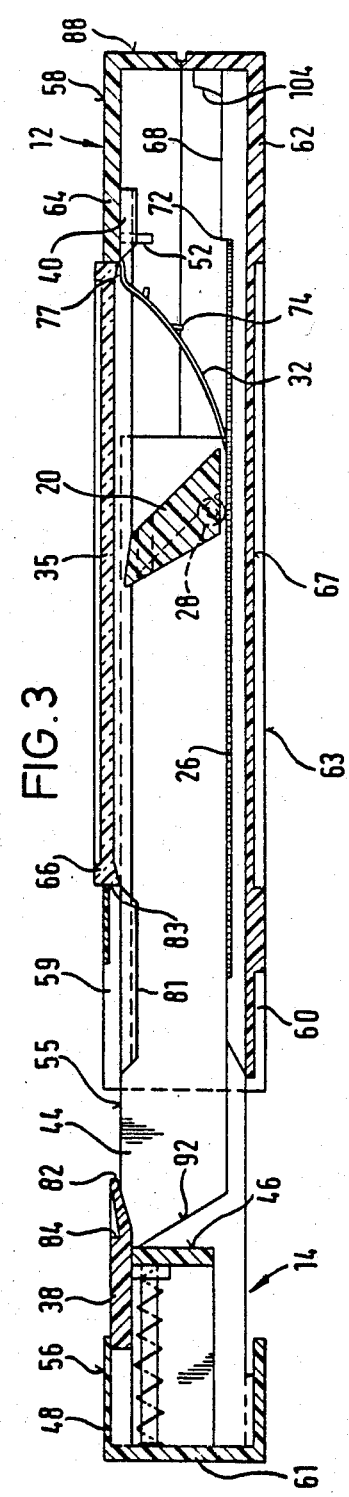

FIG. 3 shows the position of the lands 68 which protrude by fully the thickness of a photographic print further above the level of the base of the housing than the surface of the retentive coating 26. In the rest or closed position of the slider member, the lowermost portion of the shoes is spaced somewhat from the edge 72 of the land, and the surface of the separator bar facing towards the pile is sloped, somewhat like a wedge, such that, as the separator runs onto the edge of the pile, the photographs, on the opposite edge of which the hook-like members 22 are acting, "migrate" downwards along the oblique face towards the edge 72 of the lands facing them. There is sufficient room between the shoes 69 and the retentive coating 26 for the leading edge of a single photograph alone (the lowest in the pile) to be able to enter the gap forming between the shoes 69 and the retentive coatings 26, for as long as this gap is held open by the land 68 as will be explained. All the other photographs transported with the hook-like member 22 come up against the separator itself or against the shoes thereof with the result that the hook-like members slip off the extreme edge of the photographs.

When the rear edges (in the withdrawal direction) of the shoes 69 have passed the edge 72 of the lands 68, the shoes drop under the action of the wire spring 71, the rollers 28 positioning themselves on the individual photograph that has been separated in this manner and pressing it onto the associated retentive coatings so that it is firmly held in the housing, that is, the first frame part. The remainder of the pile is transported by the separator together with the slider member to the outside until the slider member has been fully withdrawn.

Care should be taken therein that the separator bar also runs over the spring arms 32. So that they do not stress the separated picture from below during the passage of their ends acting on the pile, during a certain phase of the withdrawal movement they are pressed mechanically towards the base of the housing. Spring-depresser members 73 moulded onto the slider member side pieces 44 are used for this purpose; these spring-depresser members pass over projections 74 extending laterally from the spring arms and hold the arms correspondingly to their length for a part of the withdrawal movement. Further spring-depresser members 75 on the slider member side pieces run onto the spring arms 24 at the enlarged portion 76 as soon as the individual photograph has been safely held between the retentive coating and the rollers, and press these arms likewise away from the viewing window so that further photographs can be introduced and others removed without hindrance.

On the side of the separator furthest from the pile the spring arms 32 are released again after travelling a short distance so that they again act from beneath the separated photograph and guide its rear edge gradually towards the window. Finally, this edge positions itself under the influence of the springs against the upper side of the housing. Because the free ends of the spring arms are rounded, but this edge shall on the other hand be firmly held at the position it has reached, a short portion of the spring arms is additionally of linear formation, denoted by 77 in FIG. 4. The rounded spring arm end finds space in a recess on the inside of the housing top wall, denoted by 78 in FIG. 5.

The two hook-like members 22, the two shoes 69, the retentive coatings 26 and the spring arms 32 are all in each case arranged symmetrically with respect to the central plane of the device as a whole, and the two hook-like members 22 lie as exactly as possible on a line that is at right angles to this plane of symmetry. This means that the photograph to be changed then goes through the changeover operation without being rotated even when it is not guided by the slider member side pieces because it has dimensions smaller than its nominal ones. The dimensional tolerances of photographs are in fact, with the same nominal size, different in the transverse and longitudinal direction: since the processing firms work with photographic paper from rolls of very accurately defined width and then cut the photographic paper up into different lengths, it is preferable to have the closer toleranced dimension of the photograph in a direction appropriate to that in which the slider member moves.

The separated individual picture, which until now is held only at its one edge, is lifted in its entirety towards the window. For this, the leaf springs 30 already mentioned having forwardly-positioned arms 79 and rearwardly-positioned arms 80 are used, these arms holding and supporting the individual photograph, as seen clearly from FIG. 5, in such a manner that it is able to return to the pile again as the slider member is pushed back in. In the closed state of the device and during the withdrawal movement of the slider member, at least during the initial part thereof, the spring arms 79, 80 are pressed by the side pieces of the slider member into complementary grooves in the base of the housing, which may be seen in FIG. 6.

At the start of the return movement of the slider member, the individual photograph is held by the spring arms 32 in front of the stop members 52 moulded on the housing and is supported in the direction of the separator bar at four points by the spring arms 79, 80. The other transverse edge of the photograph facing towards the separator bar may hang down; the side of the separator facing it is, however, sloped, somewhat like a wedge, so that the edge is raised gradually as the separator bar runs onto it. Between the top edge of the separator bar and the top wall of the housing there is a gap which is generously dimensioned for the passage of the photograph. The risk of the photograph striking against the edges facing it of the remainder of the pile transported by the slider member is countered by the top wall of the housing having holding-down lugs 81 on its inside which hold the pile below the level of the top side of the separator. These holding-down lugs are aligned with the ribs 40 so that they pass through the complementary recesses 42, 54 of the separator bar.

The slidable catch 38 is mounted so as to slide in the grip part and is biassed by a spring towards the housing, as readily recognisable from FIG. 3. As the slider member is inserted, the free edge 82 of the slidable catch strikes against a stop member 83 provided in the housing, as a result of which the slidable catch is pushed back into the grip part and does not project into the space visible through the housing window. Once the slider member has been pulled out, however, the slidable catch prevents the photographs lying in the slider member from falling out. To change the photographs, the slidable catch can be pushed back manually, which is facilitated by the finger-engageable edge 84. The photographs may be pushed out from the underside of the slider member by getting hold of them between the side pieces, or they may be grasped from above next to the grip part.

In the case of the procedure described so far, the separated photograph always remains behind in the housing. It is not possible, or only possible with difficulty, to remove this from the device. In order to be able to remove the pile even when this consists of one picture only, a special arrangement is therefore provided.

A control bar 85 is slidably mounted in the housing, held by retainers 86 moulded onto the housing. The bar carries an actuating or control key 87 which passes through the rear wall 88 of the housing and projects slightly beyond the outline of the changeover device. By applying pressure with the finger to the key, the bar runs on wedge-like guide members 89 on the base of the housing and is thereby lifted towards the window. The width of the bar fits exactly into a complementary recess 90 in the separator and blocks, for the entire withdrawal movement of the slider member, the throughgap of the separating means, so that every picture located in the device has to be transported out with the slider member. Close to the outer end position of the slider member, its separator bar runs over an upwardly-projecting part 91 of the bar which yields resiliently downwards; if the slider member is now pushed back in, the separator bar first pushes the bar back into its initial position, before it can be freely guided back after deflection again of the upwardly-projecting part 91.

As mentioned above, the photographs are intended to be held by the means described at a distance from the window pane so that during the changeover operations it does not come into contact with the surface of the picture, causing scratch damage to occur. There is still this danger, however, because the photographs are not always flat, but generally speaking are bowed either in the longitudinal or in the transverse direction. In the case of bowing in the longitudinal direction, the ribs 36 effective for the entire withdrawal movement are sufficient. In the other case, however, the slidable catch is effective but the opposite portion of the separator bar would hardly be able to absorb the considerable stresses which occur in a relatively thick pile of similarly bowed photographs.

Beneath the stop faces 50 the front wall of the slider member therefore has, near the side pieces 44, inclined faces 92 which are substantially parallel to the separator slope lying opposite. The photographs thus lie so that they are staggered obliquely between separator and inclined faces, so that most of the stresses in the pile are distributed over the entire surface of the separator. In addition, in the centre of the separator bar a projection 93 is provided which takes up the residual stress of those photographs which are supported against the stop faces 50 perpendicular to its edge.

Once the user has begun to carry out the changeover movement, this must be completed in order to bring the device back into the initial position. The slider member cannot therefore be pulled out halfway and then pushed in again.

This is effected by means of a mechanism comprising a toothed rack 94 with which a pinion 95 meshes, the pinion being integrally-formed with its shaft. The shaft fits in a slot running parallel to the rack in the side piece 44 of the slider member, in which slot it is pressed and held by means of a small leaf spring, moulded onto the pinion, and resting against the housing.

The slot is divided by means of a rib into two parts, in which the shaft has only a little lateral play. Finally, moulded onto the slider member on both sides of the slot there are locking lugs 100, 101 which lie in the plane of the toothed circumference of the pinion and the points of the lugs are engageable with the latter.

It is important to note that over the greater part of the withdrawal travel of the slider member the retaining means is indeed embodied by the rollers 28 in conjunction with the retentive coatings 26, but over the last part of the travel, shortly before the end position is reached, the spring arms 32, by firmly holding the individual photograph, also act as an "extension" of the retaining means.

As is apparent from the preceding explanation, each rearranged sheet is never released during the whole changeover cycle, but is held at at least two points and thus secured against rotation. It is thus constantly under control, in this case with means symmetrical to the axis.

The limbs of the slider member side pieces which are parallel to the pile and on which the separated sheet supports itself during rearrangement, should be at the most at such a distance from each other that a short photograph, which rests with one edge just against a limb of a side piece perpendicular thereto, is still held by the opposite side piece on the other edge.

As mentioned above, the device has the viewing window in the upper shell of the housing. The dimension of the window is then at the most so great in the direction transverse to the direction of movement that the shortest possible photograph, even if it is lying off-centre, does not present itself with its edge in the field of view. The same applies to the ribs 36, and just the same considerations apply to the spring arms 79 and 80 and especially to all components engaging with the sheet faces.

The construction of the spring system which is described above and illustrated, formed by the springs, cut in one piece and arranged symmetrically in pairs, with the spring arms 24 and 32, fulfills a total of five functions. Firstly, the hook-like members 22 moulded on them form the feeding means, the hook-like members finally taking along only one sheet into the separating means. Secondly, both arms together—or, more accurately, the four arms of the two springs—form a bias system with which the pile is neatly pressed against the window when the device is at rest. Thirdly, the arm 32, after it has been passed over by the separator, serves to convey the individual sheet to the housing top wall and there, fourthly, hold it firmly. Fifthly, and finally, the arms 32 are arranged close enough to the retentive coatings 26 to be able, as a result of their bias force, to displace or peel off from the retentive coating any individual sheet which might adhere to the latter owing to a static charge. It is to be noted that the arm 32 is so shaped and arranged that it can be passed over by the separator bar without any disturbance to smooth operation.

In FIGS. 9 to 12, a further example of execution of a picture changer is illustrated. The slider member 14 is housed in the housing 12 so that it can slide; the housing 12 forms the first frame part, and the slider member 14 the second. The withdrawal travel is limited by means of a bearing eye 116 which is moulded onto one of the side pieces 44 of the slider member and runs onto a stop member 18 in the housing. The housing is screwed together from an upper shell 64 and a bottom shell 62, the outer rims of which engage in an interlocking manner with each other, in the region between the side pieces 44 of the slider member and the outer edges of the housing which are parallel thereto. For this purpose, the bottom shell has in each case moulded-on guide sleeves 118 for screw shanks and also recesses on the outside for screw heads, while the upper shell carries for this purpose coaxially moulded-on bushings in which the screws cut their own thread. The window 35 is clipped into the upper shell 64 and the parts of the upper shell lying beneath its outer border areas are not visible, owing to the fact that these areas of the window are frosted In FIG. 13 the outline of the central transparent portion of the window is marked by 34.

With regard to operation, there are few differences compared with the example of execution according to FIGS. 1 to 10, so that it is sufficient to explain only the significant deviations.

In this case the spring arms 24, 32 and 80 are combined into a stamped and bent part, positioned by means of projections 128 and fixed by crimping without the application of heat. The spring arms 79, however, are separate components which are positioned on the bottom shell by means of moulded-on projections and fixed by crimping without the application of heat. In order that this spring arm arrangement can raise up the separated picture as early as possible, the corresponding side piece 44 of the slider member has recesses 130. Secure holding of the separated picture is ensured during this phase of the changeover cycle by means of the spring arms 32 and 80, which bear the extreme edge of the picture remote from the slider member upwards like a bracket.

The retentive coatings 26 are disposed on separately produced bars 134 clipped into the bottom shell. It may be seen that they are mirror-symmetrical in shape and therefore have lands 68 at both ends. The reason for this is that when the bars are to be coated automatically with the retentive coating no sorting is necessary. In addition, apertures 138 must of course be provided, through which project guide or wedge-like projections 140 for the separator bar which are moulded onto the bottom shell of the housing on the end at which it is gripped by the user. The bars are fixed in the bottom shell by pressing into corresponding channels in the bottom shell of the housing, and they are accurately positioned by means of one of two pins, namely by means of the pin remote from the grip part of the slider member, while the other pin has associated with it a slot in the housing.

The bars 134 at the same time form the guide for the control key 87 arranged in the plane of symmetry, with a projection 46, pointing towards the separator bar 20, which in cooperation with the control rib 153 renders possible the removal of the entire pile.

In the bearing eye 116 of the slider member 14 there is pivotably arranged about a journal 160 a control pawl 162 which is guided by a control projection 164 along channels which are defined by guide rails 166 moulded onto the bottom shell 62, so that the control projection 164 has to follow predetermined paths during insertion and withdrawal. During the greater part of the change-over cycle the direction of movement may be reversed without hindrance, but not when the control projection 164 is in the channel section 168 during insertion, or in the channel section 170 during the withdrawal. In the first case, if it should be desired to pull the slider member out again shortly before its inner end position, the control projection would run onto the stop member 172; in the latter case if, therefore, the slider member is pushed in again shortly before reaching the outer end position the control projection hits either the stop member 174 or the stop edge 176. It should be noted that the journal 160 is seated in the bearing eye with a degree of friction such as to allow the control pawl to follow the guide bars without any noticeable hindrance, but not to allow it to swing freely.

FIG. 13 is a simplified and enlarged representation of a longitudinal section through the device in the pushed-together position; a corresponding design may also be provided in the case of FIGS. 1 to 8. Here, too, the separator bar has a centrally-positioned projection 93 which engages between holding-down members 40. If, however, when the slider member is withdrawn, the uppermost sheet is supported only laterally by the rails 36, there is a risk that the uppermost picture or even others too may slide off the separator. This is prevented by the holding-down members 81 on the housing having, in addition, an inclined step portion 388, which checks at least the uppermost picture until its opposite-lying edge rests against the bottom face 386 of the separator and is overlapped by the projection 93 thereof. By the friction of the picture against the bottom face 390 of the holding-down member 81 this state is maintained, even if the pictures, photographic prints, are very bowed.

FIGS. 10, 11 and 12 show an arrangement of the slidable catch 38. A compression spring 600 presses the slidable catch 38 acting as holding-down member over the pile of pictures. The compression spring 600 is mounted on the slider member 14 by means of a crossed-pins device 602 and on the slidable catch 38 by means of the hollow housing 604 thereof. The slidable catch 38 is guided by the grooves 606 thereof in ribs 608. The slidable catch 38 can be pulled back either by a rib 610 arranged at its upper side or by its lateral fluting 612. Two slots 614 in the slidable catch 38 receive guide ribs 616 on the grip part 48. The travel is limited by stop members 618, 620 on the grip part 48 and on the slidable catch 38, respectively, which stop members can be brought into engagement with one another.

Figure 14:
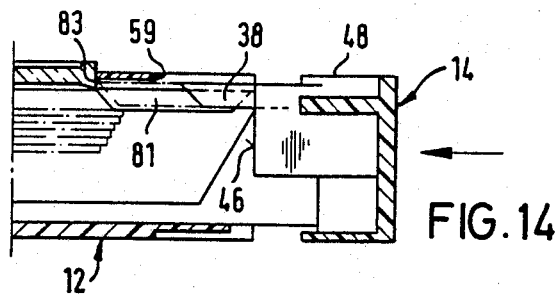

As can be seen from FIG. 14, the bottom grip part 57 engages in the front housing part so that, in the closed state, the grip bar 57 is superimposed on the corresponding part of the base of the housing. Slots in the base 63 of the housing make it possible for two connecting ribs 624 on the grip part 48, which are slightly set back, to enter. Inclined parts 626 are provided adjacent to the slider member outlet end of the housing 14, which prevent the pictures from striking the front end of the rails 134.

A rib 630 (FIG. 10), in cooperation with a complementary recess in the separator 20, serves to push pictures, which have been forced under the separator 20 during loading, into their proper position.

Ribs 636 prevent the pile of pictures striking the hook-like part of the spring 24.

Figure 15:
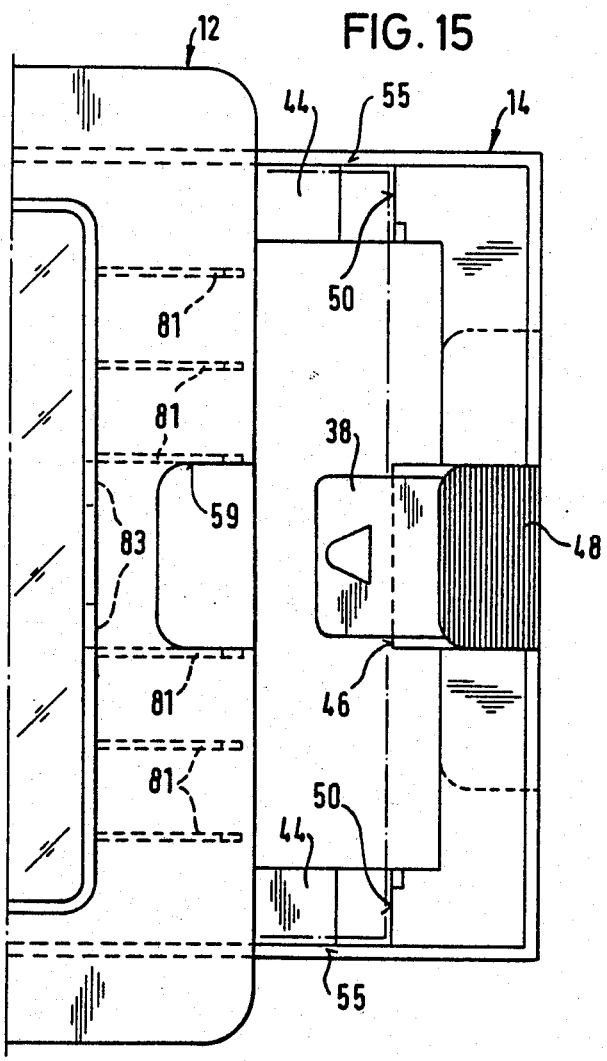
Figure 16:
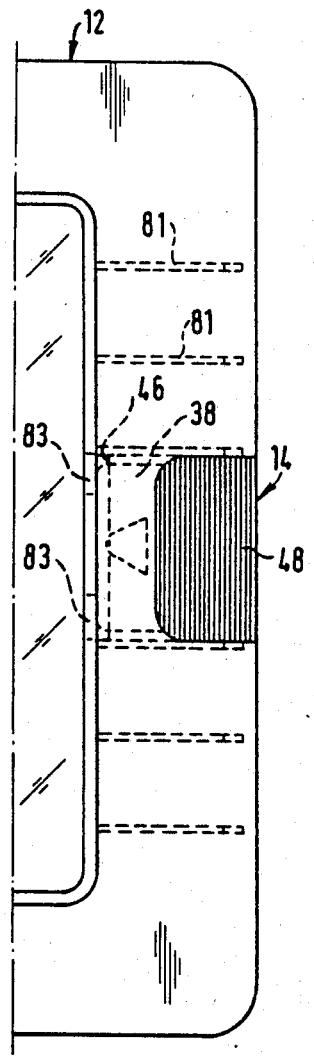

FIGS. 14 to 18 show an alternative design of the slidable catch 38 in cooperation with the housing 12. FIG. 15 corresponds to the position according to FIG. 1 in which the slidable part assumes its outer end position. If the slider member is now pushed in, the slidable part 38 strikes against the edge 83 and is pushed in slightly. To remove the pile it can be pushed in even further.

During removal of the pile, in the embodiments illustrated hitherto the slidable part was blocked by the finger. FIGS. 17 and 18 show how the slidable part 38 can be automatically locked in this innermost position. For this purpose there are pivotally mounted on the slidable part two resilient arms 526 which, during a normal changeover operation, are deflected inwards, but do not yet lock in the guides 528. Only when the slidable part is pushed in fully does locking occur at the stepped portion 530. If the slider member is then introduced into the housing again, the resilient arms strike the ribs 81 and are thereby released. The arrows 532 and 535 define the partially inserted and fully inserted positions, respectively, of the slidable part.

Whilst FIG. 19 shows again the means according to the invention from the example of execution according to FIGS. 1 to 8, FIG. 20 shows a variant. The slidable catch 38 and the central region of the housing upper shell can again be seen, the window being elevated so far that even very bowed pictures cannot be scratched, although the ribs 81 are omitted because the slidable part acts as holding-down member. In this case the ribs 36 act as a check for the uppermost sheet.

Figure 21:
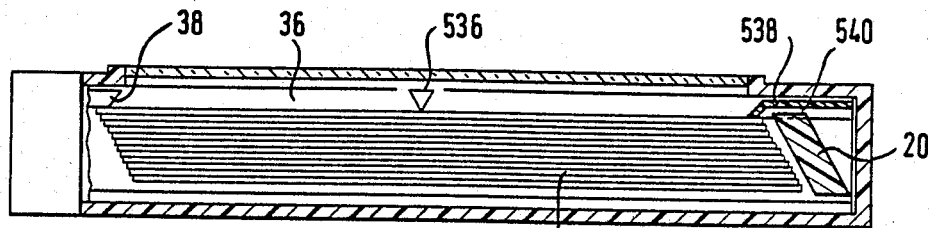
Figure 22:
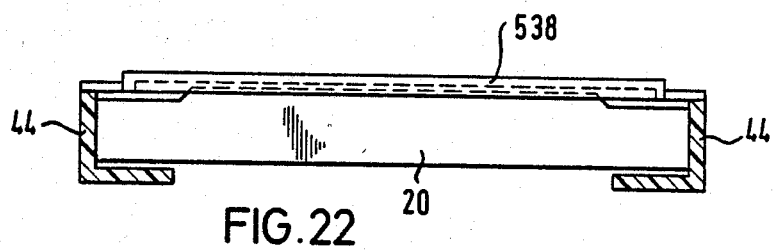
Figure 23:
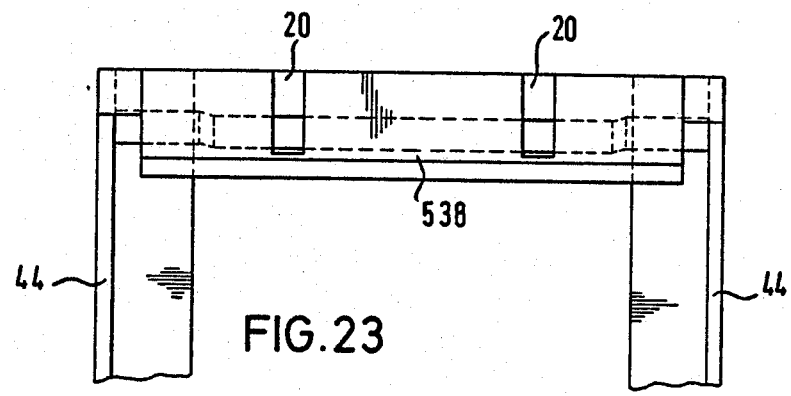

FIGS. 21 to 23 show one variant. The slidable catch 38 can again be seen, the underside of which defines the level 536, that is, the level of the sheet in the pile 182 facing the window. The longitudinal ribs 36 moulded onto the housing top wall and a roof part 538, which is connected to the slider member side-pieces 44 and roofs over the separator bar 20, extend up to the same level. If the separator passes by the window, the roof part 538 is always still bewween the sheets and the window without brushing against the latter. The separated sheet passes through the gap 540 between separator and roof part in a dipping movement during the return travel.

Figure 24:
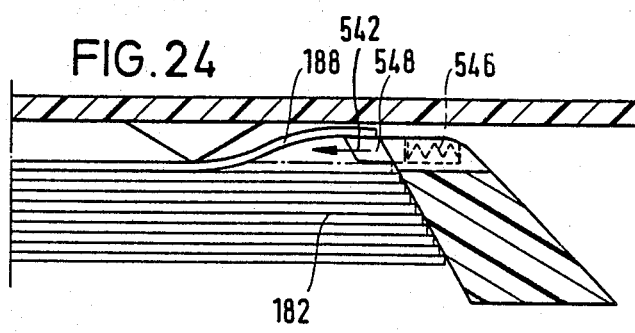
Figure 25:
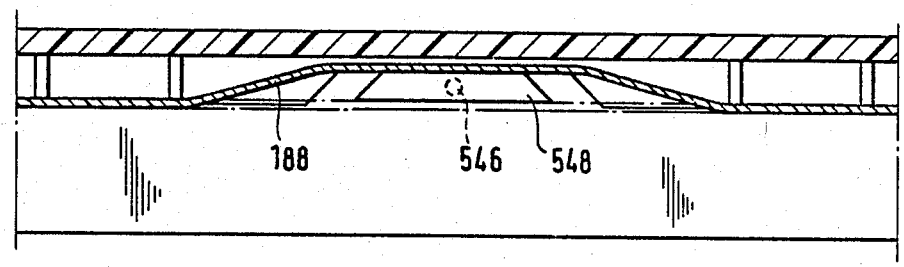

FIGS. 24 and 25 illustrate another feature in the region of the separator. The pile is, indeed, held by the slidable catch opposite the separator and held by the ribs 36 laterally spaced from the window. It is now in this case shown how in the separator bar an auxiliary bar 528, pushed out in the direction of the arrow 524 by a spring 526, overlaps that edge of the pile 182 which faces it. If, during a changeover cycle, the one photograph 188 has passed over the separator bar, its rear edge bears against this auxiliary bar. Provision is therefore made for the auxiliary bar, in the withdrawn position, to run laterally onto stop members (not shown) on the housing, so that it is pressed back and releases the edge.

Figure 26:
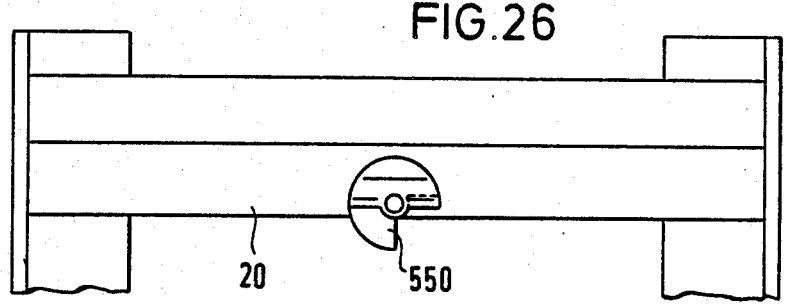
Figure 27:
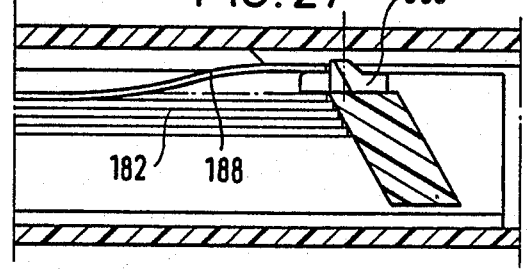

In the variant according to FIGS. 26, 27, there is arranged on that side of the separator bar which borders the return through-gap a rotatable snail-cam like member 550, which positioned at one angle has the same function as the auxiliary bar 142 (cf. FIG. 27) but positioned at another angle lowers the edge onto the pile and releases it. Also the member 550 is controlled by running onto stop members (not shown).

Figure 28:
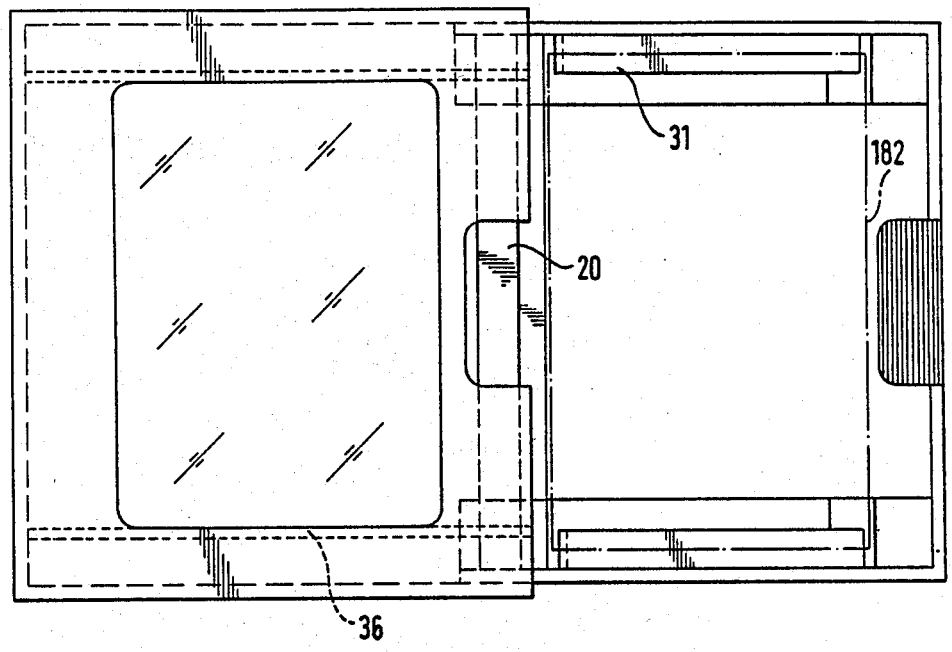
Figure 29:
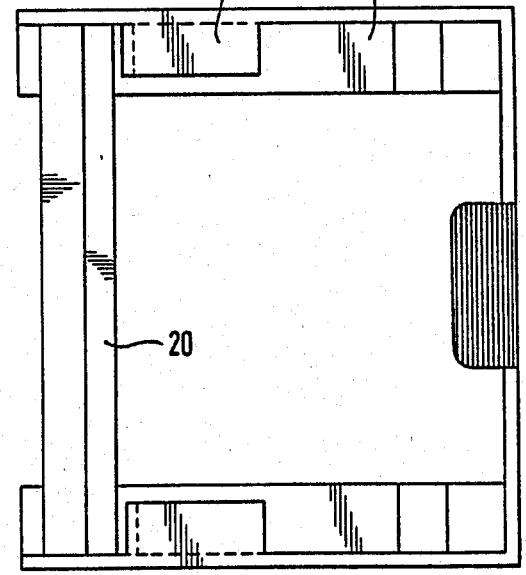
Figure 30:
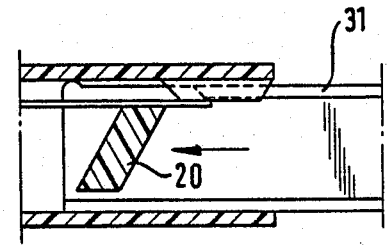

The ribs 36 are shown in FIG. 28 but are merely for the purpose of detailing since in this variant they are functionally replaced by tabs 31 attached to the slider member and overlapping the pile laterally. The outline of the pile 182 is indicated by broken lines. For removal of the pile, the tabs would have to be, for example, retracted, which is not shown. A simplified version of this concept is shown in FIG. 29 where these tabs are shortened to such an extent that a passage 33 for the pile is formed. FIG. 30 shows how the separated sheet slots in beneath these tabs.

FIGS. 31, 32 and 33 show again in detail the circumstances in FIGS. 1 to 5. In FIG. 32 a single sheet 188 is indicated as a thick line in order to indicate how it undulates, for example, transversely to the pushing-out direction, if the components engaging in each other and meshing with each other act on it. The line marked by the arrow 37 indicates the highest level to which the upper side of the pile can go.

FIG. 33 shows a section through the separator 20 in the region of the projection 93, and the extent by which this projection projects towards the pile is indicated by 39.

I claim:

1. Apparatus for cyclically rearranging a pile of sheets, comprising a first frame part having a viewing window for allowing the sheet at one end of said pile to be viewed, and a second frame part reciprocable relative to and parallel to said window, and means for removing, upon each reciprocation, an individual sheet at one end of the pile leaving a remainder of the pile and for adding the individual sheet to the other end of the pile, said means for removing including a separator bar on one of said frame parts for retaining the remainder of the pile, said separator bar extending transverse to the direction of reciprocation adjacent one end of said one frame part and having a first side facing toward said window and a second side facing away from said window, said individual sheet being removed across one of said sides of said separator bar and returned to the pile across the other of said sides of said separator bar, wherein during each reciprocation, a sheet facing said window is moved along said window parallel to said direction of reciprocation together with said second frame part, and means on said second frame part for acting on an edge of said window-facing sheet transverse to said direction of reciprocation which moves along said window to keep said edge, during said movement, spaced from said window.

2. The apparatus defined in claim 1 wherein said means for acting are arranged and designed to act at least in the vicinity of the center of said sheet edge.

3. The apparatus defined in claim 1 wherein said means for acting comprise hold-down members on said second frame part, said hold-down members and said separator bar collectively defining a slot spaced from said window.

4. The apparatus defined in claim 3 wherein said hold-down members extend substantially parallel to said separtor bar.

5. The apparatus defined in claim 3 wherein said hold-down members extend substantially transverse to said separator bar.

6. The apparatus defined in claim 1 wherein said separator bar is on said second frame part and said means for acting comprise at least one hold-down member on said separator bar adjacent said window.

7. The apparatus defined in claim 6 wherein said at least one hold-down member is integrally formed with said separator bar and has a free end adapted to be moved over said edge of said window-facing sheet upon the start of said reciprocation.

8. The apparatus defined in claim 7 including means for braking at least the window-facing sheet against movement relative to said first frame part upon the start of said reciprocation.

9. The apparatus defined in claim 8 wherein said hold-down member has an inclined surface portion adapted to engage over an edge of said window-facing sheet which is parallel to and adjacent said separator bar.

10. The apparatus defined in claim 8 wherein said means for braking comprise sloping surface portions engaged by said window-facing sheet.

11. The apparatus defined in claim 10 wherein said sloping surface portions are provided on ribs extending inward from a wall surrounding said window.

12. The apparatus defined in claim 8 wherein each said hold-down member is movable from its hold-down position into a retracted position permitting return of said individual sheet to said pile.

13. The apparatus defined in claim 12 wherein each said hold-down member is moved in response to said reciprocation.

14. The apparatus defined in claim 6 wherein said hold-down member is molded onto said separator bar.

15. The apparatus defined in claim 1 wherein said first frame part has an opening through which said second frame part reciprocates, and has additional sheet spacing means between (a) an edge of said window adjacent said opening and (b) said opening.

16. The apparatus defined in claim 15 including a wall surrounding said window, and said additional spacing means extending from said wall into said first frame part.

17. The apparatus defined in claim 16 wherein said additional spacing means include ribs extending in said direction of reciprocation.

18. The apparatus defined in claim 17 wherein said ribs have wedge-shaped ends.

19. The apparatus defined in claim 18 wherein each of said ribs has two opposite ends, both of which are wedge-shaped.

20. The apparatus defined in claim 19 wherein said ribs project beyond said separator bar when said second frame part is fully withdrawn from said first frame part.

21. The apparatus definied in claim 15 wherein said means for acting and said additional spacing means define a level uniformly spaced from said window.

22. The apparatus defined in claim 15 including further spacing means acting on those edges of said window-facing sheet which extend parallel to said direction of reciprocation.

23. The apparatus defined in claim 22 wherein all of said means engaging over the four sheet edges are provided on the second frame part.

24. The apparatus defined in claim 23 wherein said further spacing means include tabs molded onto said second frame part.

25. The apparatus defined in claim 22 wherein said second frame part includes struts engaged by those sheet edges that are parallel to said reciprocation direction, and wherein said further spacing means define a first level for said window-facing sheet that is more remote from said window than a second level defined by said struts.

26. The apparatus defined in claim 22 wherein said further spacing means include ribs on said first frame part projecting into recesses in said separator bar.

27. The apparatus defined in claim 1 wherein said second frame part has a hold-down element adapted to engage over another edge of said window-facing sheet which is opposite to said edge which moves along said window.

28. The apparatus defined in claim 27 wherein said hold-down element is displaceable between a holding-down position and a release position.

29. The apparatus defined in claim 28 wherein said hold-down element is displaceable in said reciprocation direction.

30. The apparatus defined in claim 29 including two hold-down elements opposite each other.

31. The apparatus defined in claim 5 wherein at least one of said hold-down elements is displaced in response to said frame part reciprocation.

32. The apparatus defined in claim 28 wherein said displaceable hold-down element is biased by a spring into one of its end positions.

33. The apparatus defined in claim 32 wherein said displaceable hold-down element is biased into a position in which it engages over said other sheet edge, and is displaceable by running onto a stop member on said first frame part.

34. The apparatus defined in claim 33 wherein said displaceable hold-down element, on running onto the stop member, is displaceable into a position in which it releases said other sheet edge, the level of which is then defined by ribs molded onto said first frame part.

35. The apparatus defined in claim 33 wherein said stop member is so positioned that the displaceable hold-down element is not visible through said viewing window.

36. The apparatus defined in claim 34 wherein said second frame part has stop means for defining a second end position of said displaceable hold-down element, and said stop member on said first frame part defining a position of said hold-down element between said end positions.

37. The apparatus defined in claim 27 wherein said means for acting and said hold-down element define a sheet level equally spaced from said window.

38. The apparatus defined in claim 27 wherein said displaceable hold-down element is mounted in a grip part of said second frame part.

39. The apparatus defined in claim 27 including further spacing means acting on those edges of said window-facing sheet which extend parallel to said direction of reciprocation, and wherein all of said means engaging said window-facing sheet define a common level for all four sheet edges.

40. The apparatus defined in claim 39 in which, when said second frame part is beneath said window, all of said means engaging said window-facing sheet are covered by surface areas of the frame parts surrounding the window.

41. The apparatus defined in claim 1 wherein said separator bar forms a part of said second frame part.

42. The apparatus defined in claim 41 wherein said means for acting include a spacer member on said second frame part extending between said separator bar and said window and defining with said bar a sheet passage slot.

43. The apparatus defined in claim 41 wherein said means for acting include spacer members on said second frame part extending parallel to said direction of reciprocation and having end borders defining with said bar a sheet passage slot.

44. The apparatus defined in claim 41 wherein said means for acting include guide means for said individual sheet.

45. The apparatus defined in claim 44 wherein said guide means extend substantially parallel to said window.

46. The apparatus defined in claim 44 wherein said means for acting are provided on said separator bar.

47. The apparatus defined in claim 46 wherein said means for acting is displaceable between an active hold-down position and an inactive position allowing for passage of said individual sheet.

48. The apparatus defined in claim 47 wherein said means for acting is displaceable in said direction of reciprocation.

49. The apparatus defined in claim 47 wherein said means for acting is pivotable about an axis transverse to said direction of reciprocation.

50. The apparatus defined in claim 47 wherein displacement of said means for acting is controlled by said reciprocation.

51. The apparatus defined in claim 41 wherein said means for acting is integrally formed with said separator bar and engages, upon start of said reciprocation, over said edge, and wherein said first frame part has means for temporarily braking said window-facing sheet against being moved together with said pile.

52. The apparatus defined in claim 51 wherein said braking means include wedge shaped members engaged by the edge of said window-facing sheet opposite to said edge which moves along said window.

53. The apparatus defined in claim 41 wherein said second frame part includes means for offsetting the sheets in said pile in said direction of reciprocation.

54. The apparatus defined in claim 78 wherein said means for offsetting comprise inclined wall portions of said second frame part.

55. Apparatus for cyclically rearranging a pile of sheets, comprising a first frame part having a viewing window for allowing the sheet at one end of said pile to be viewed, and a second frame part reciprocable relative to and parallel to said window, and means for removing, upon each reciprocation, an individual sheet at one end of the pile leaving a remainder of the pile and for adding the individual sheet to the other end of the pile, said means for removing including a separator bar on one of said frame parts for retaining the remainder of the pile, said separator bar extending transverse to the direction of reciprocation adjacent one end of said one frame part and having a first side facing toward said window and a second side facing away from said window, said individual sheet being removed across one of said sides of said separator bar and returned to the pile across the other of said sides of said separator bar, wherein during each reciprocation, a sheet facing said window is moved along said window parallel to said direction of reciprocation together with said second frame part, means on said second frame part for acting on an edge of said window-facing sheet transverse to said direction of reciprocation which moves along said window to keep said edge, during said movement, spaced from said window, said means for acting including hold-down members on said one frame part spaced from said separator bar to define a sheet passage slot for said individual sheet between said separator bar and said hold-down members.

56. Apparatus for cyclically rearranging a pile of sheets, comprising a first frame part having a viewing window for allowing the sheet at one end of said pile to be viewed, and a second frame part reciprocable relative to and parallel to said window, and means for removing, upon each reciprocation, an individual sheet at one end of the pile leaving a remainder of the pile and for adding the individual sheet to the other end of the pile, said means for removing including a separator bar on one of said frame parts for retaining the remainder of the pile, said separator bar extending transverse to the direction of reciprocation adjacent one end of said one frame part and having a first side facing toward said window and a second side facing away from said window, said individual sheet being removed across one of said sides of said separator bar and returned to the pile across the other of said sides of said separator bar, wherein during each reciprocation, a sheet facing said window is moved along said window parallel to said direction of reciprocation together with said second frame part, means on said second frame part for acting on an edge of said window-facing sheet transverse to said direction of reciprocation which moves along said window to keep said edge, during said movement, spaced from said window, said means for acting including a hold-down member on said separator bar, said hold-down member having a side facing said window-facing sheet and another side facing away from said window-facing sheet, and control means for passing an end edge of said individual sheet from one hold-down member side to the other.

57. The apparatus defined in claim 56 wherein said hold-down member can be moved into a wall of the second frame part.

58. The apparatus defined in claim 57 wherein said hold-down member is controlled by stop members onto which they run in an inner end position of the frame parts.

* * * * *

UNITED STATES PATENT AND TRADEMARK OFFICE
CERTIFICATE OF CORRECTION

PATENT NO. : 4,783,919

DATED : November 15, 1988

INVENTOR(S) : Peter Ackeret

It is certified that error appears in the above-identified patent and that said Letters Patent is hereby corrected as shown below:

| Column | Line | |
|--------|------|---|
| 12 | 18 | Change "separtor" to --separator--. |
| 12 | 46 | Change "8" to --6--. |
| 13 | 43 | Change "5" to --30--. |
| 14 | 64 | Change "78" to --53--. |

Signed and Sealed this

Sixteenth Day of July, 1991

Attest:

HARRY F. MANBECK, JR.

Attesting Officer

Commissioner of Patents and Trademarks